United States Patent [19]

Kuwana et al.

[11] Patent Number: 5,176,430
[45] Date of Patent: Jan. 5, 1993

[54] ANTI-SKID CONTROL SYSTEM FOR AN AUTOMOTIVE VEHICLE

[75] Inventors: Kazutaka Kuwana, Toyota; Tsuyoshi Yoshida, Obu; Hiroyuki Ichikawa, Okazaki; Kenji Tozu, Kariya, all of Japan

[73] Assignee: Aisin Seiki Kabushiki Kaisha, Kariya, Japan

[21] Appl. No.: 613,069

[22] Filed: Nov. 15, 1990

[30] Foreign Application Priority Data

Nov. 16, 1989 [JP] Japan ................. 1-298490

[51] Int. Cl.$^5$ ............................... B60T 8/58
[52] U.S. Cl. ..................... 303/100; 303/110
[58] Field of Search .......... 303/100, 110, 113, 107; 364/426.02

[56] References Cited

U.S. PATENT DOCUMENTS

| 4,349,876 | 9/1982 | Lindenmann | 364/426.01 |
| 4,585,280 | 4/1986 | Leiber | 303/110 |
| 4,805,103 | 2/1989 | Matsuda | 308/110 |
| 4,912,641 | 3/1990 | Kuwana et al. | 364/426.02 |

FOREIGN PATENT DOCUMENTS

| 2855326 | 7/1980 | Fed. Rep. of Germany . |
| 3306611 | 8/1984 | Fed. Rep. of Germany . |
| 3836515 | 5/1989 | Fed. Rep. of Germany . |
| 49-56083 | 5/1974 | Japan . |
| 2135413 | 8/1984 | United Kingdom . |

Primary Examiner—Matthew C. Graham
Attorney, Agent, or Firm—Burns, Doane, Swecker & Mathis

[57] ABSTRACT

The invention is directed to an anti-skid control system for controlling braking forces applied to road wheels with hydraulic braking pressure supplied from a master cylinder to wheel brake cylinders and controlled in response to braking condition of the road wheels. A wheel speed of at least one of the road wheels is detected to provide an output signal corresponding to the wheel speed. A hydraulic braking pressure supplied to each of the wheel brake cylinders is increased, held or decreased in response to a variation of the wheel speed. The hydraulic braking pressure supplied to each of the wheel brake cylinders is increased in response to a proportion between an increasing time for increasing the pressure and a holding time for holding the pressure. The increasing time provided for one of at least two wheel brake cylinders is prohibited from being coincident with the increasing time provided for the other. Thus, the timing for increasing the hydraulic braking pressure in one of the wheel brake cylinders will not coincide with that in the other.

5 Claims, 11 Drawing Sheets

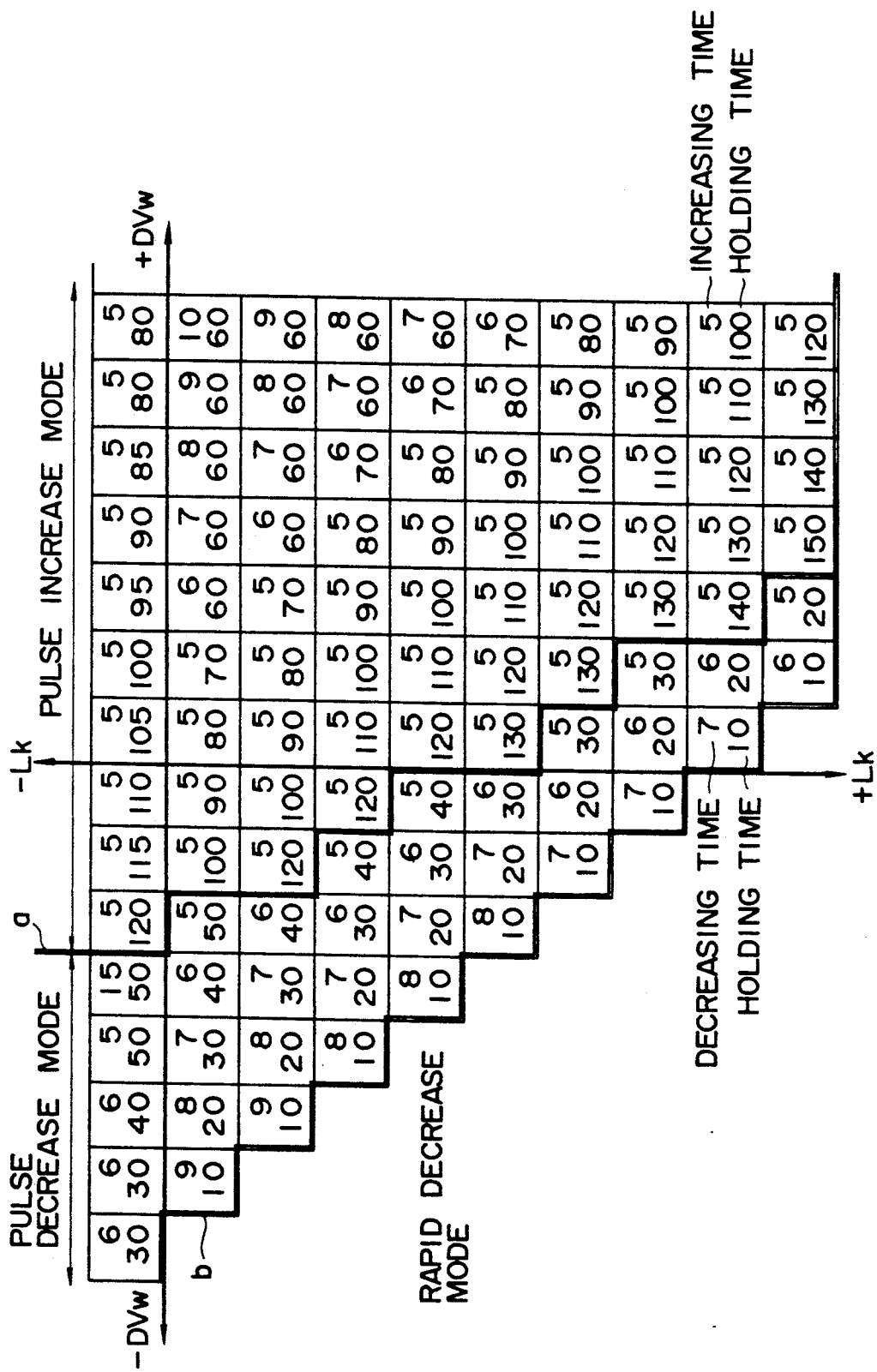

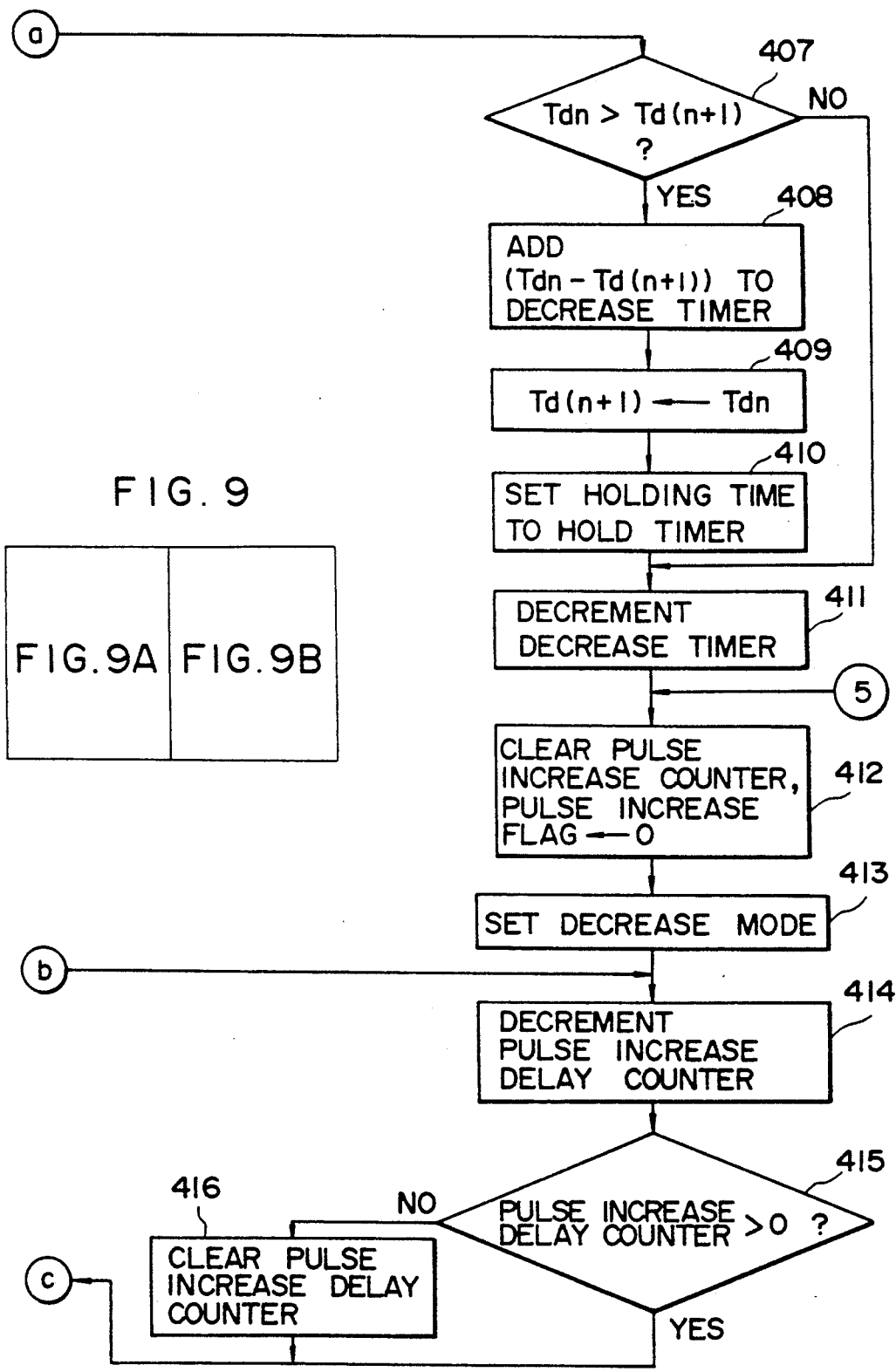

ANTI-SKID CONTROL SYSTEM FOR AN AUTOMOTIVE VEHICLE

BACKGROUND OF THE INVENTION

1. Field of the Invention

The present invention relates to an anti-skid control system for use in an automotive vehicle, and more particularly to an anti-skid control system for controlling braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation. In order to prevent the road wheels from being locked, therefore, there has been employed an anti-skid control system which controls the braking force by decreasing or increasing a hydraulic braking pressure supplied to a wheel brake cylinder. In view of the fact that when the hydraulic braking pressure supplied to the wheel brake cylinder is increased, the rotational speed of the road wheel is rapidly reduced immediately before a coefficient of friction of a road surface relative to the road wheel reaches a maximum, the anti-skid control system controls the hydraulic braking pressure in response to the variation of wheel speed and that of wheel acceleration in order that a slip rate of the road wheel results in around 10% to 20%, that is, the maximum coefficient of friction is obtained.

In connection with the anti-skid control system as described above, Japanese Patent Laid-open Publication No. 49-56083 discloses an anti-skid control system provided with a pair of inlet valves disposed between a pair of wheel brake cylinders mounted on either sides of a vehicle and a master cylinder for applying a hydraulic braking pressure to the wheel brake cylinders. This anti-skid control system is arranged to increase gradually the hydraulic braking pressure in the wheel brake cylinders by energizing or de-energizing the inlet valves simultaneously.

In the prior system which simultaneously increases the hydraulic braking pressure supplied to a pair of wheel brake cylinders with a pair of inlet valves energized or de-energized simultaneously, there is no lag between their pressure increasing timings, so that the characteristics such as the increasing speed of the hydraulic pressure and etc. are stable. However, the hydraulic pressure in the master cylinder is decreased largely when the hydraulic pressure in the wheel brake cylinders is increased, so that the depressed amount of the brake pedal comes to be large to thereby injure a pedal feeling, i.e., the feeling in braking operation.

Also, there is known an anti-skid control system which increases the hydraulic braking pressure in a wheel brake cylinder mounted on each of the road wheels without controlling a timing for increasing the hydraulic braking pressure. In this system, therefore, the timing for increasing the pressure in one of the wheel brake cylinders may coincide with the timing for increasing the hydraulic braking pressure in another of the wheel brake cylinders, or may not coincide therewith. In the case where the coincidence occurs, the hydraulic braking pressure in the master cylinder is decreased largely to thereby enlarge the depressed amount of the brake pedal comparing with the case where it does not. In the case where the coincidence does not occur, the hydraulic braking pressure in the master cylinder is decreased small, so that the depressed amount of the brake pedal is small. Consequently, a bad pedal feeling is caused, which is not appropriate for a feeling in braking operation. Further, the increasing speed of the hydraulic pressure will vary between the cases where the timing for increasing the hydraulic braking pressure in one of the wheel brake cylinders coincide with that in the other thereof, or where the former does not coincide with the latter, so that it is difficult to effectuate a desired hydraulic braking pressure control.

SUMMARY OF THE INVENTION

Accordingly, it is an object of the present invention to provide an anti-skid control system for an automotive vehicle which improves the feeling in braking operation without causing a pressure increasing characteristic to be unstable.

In accomplishing the above and other objects, an anti-skid control system for an automotive vehicle which has wheel brake cylinders mounted on road wheels for applying braking forces thereto and a master cylinder for supplying a hydraulic braking pressure to the wheel brake cylinders. The anti-skid control system is provided with means for detecting a wheel speed of at least one of the road wheels and providing output signal corresponding to the wheel speed, pressure control means for receiving the output signal, and increasing, holding or decreasing the hydraulic braking pressure supplied to each of the wheel brake cylinders, in response to a variation of the wheel speed, and prohibition means for prohibiting at least two of the wheel brake cylinders from being increased simultaneously.

In the above-described anti-skid control system, the pressure control means is preferably arranged to increase the hydraulic braking pressure supplied to each of the wheel brake cylinders in response to an increasing time for increasing the hydraulic braking pressure and a holding time for holding the hydraulic braking pressure as it is which are provided alternately.

The prohibition means in the above-described anti-skid control system may be arranged to prohibit said increasing time provided for one of the two wheel brake cylinders from being coincident with the increasing time provided for the other.

In the anti-skid control system according to the present invention, the above-described at least two wheel brake cylinders may be connected to one of two hydraulic circuits for connecting the master cylinder to the wheel brake cylinders mounted on the road wheels.

Brief Description of the Drawings

The above stated objects and following description will become readily apparent with reference to the accompanying drawings, wherein like reference numerals denote like elements, and in which.

Figure 1:
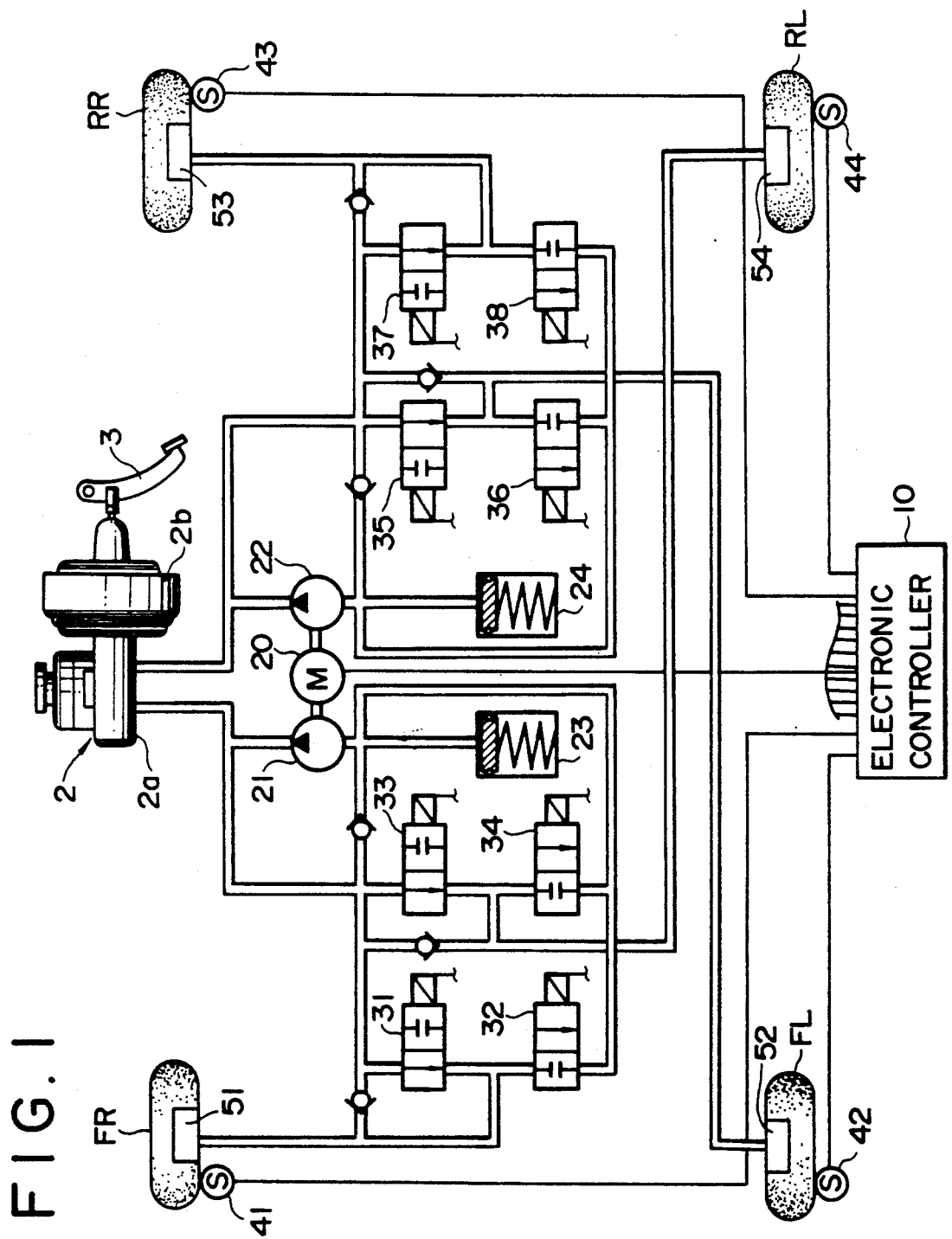
FIG. 1 is a schematic block diagram of an anti-skid control system of an embodiment according to the present invention.
Figure 5:
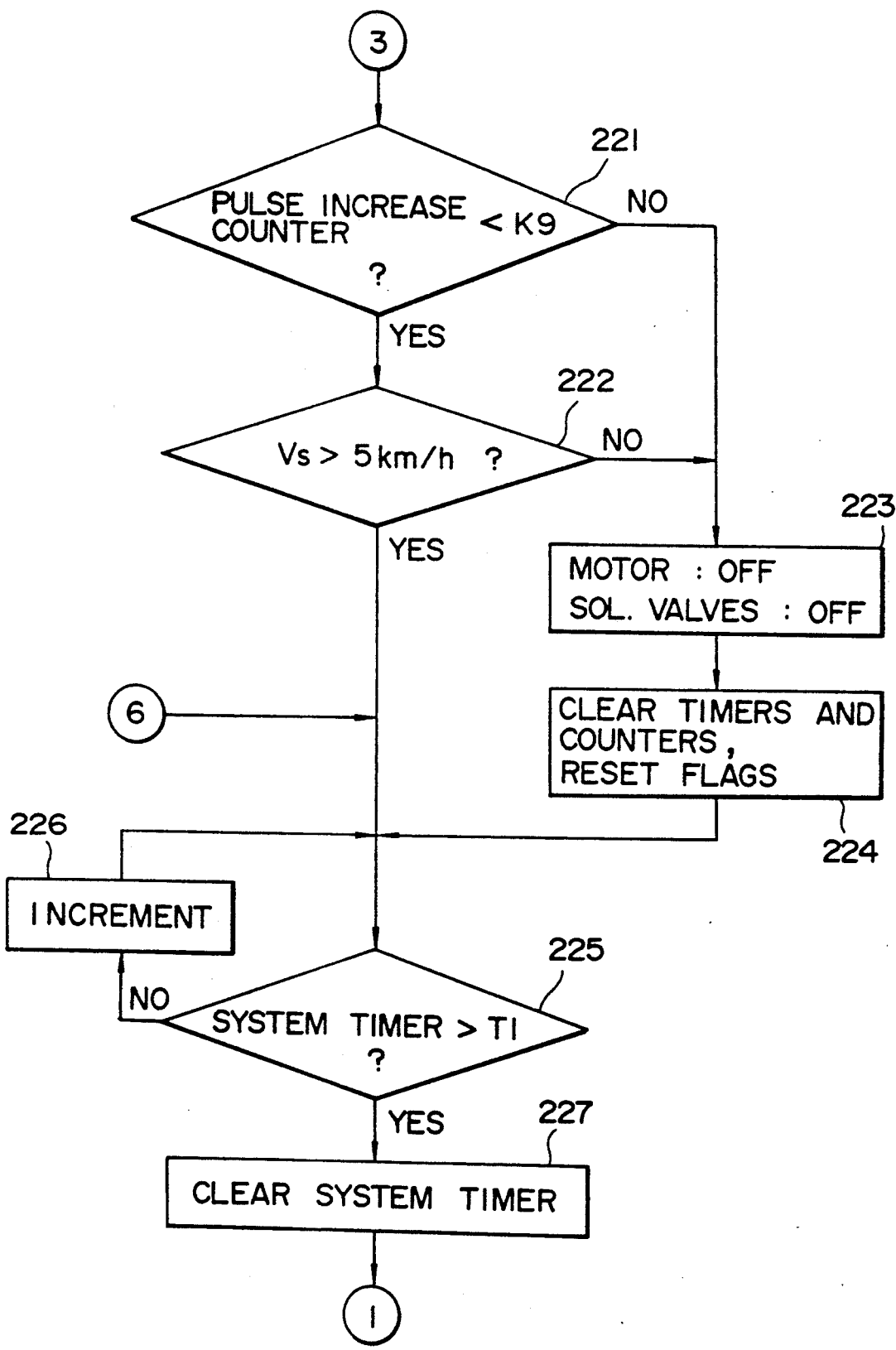
Figure 6:
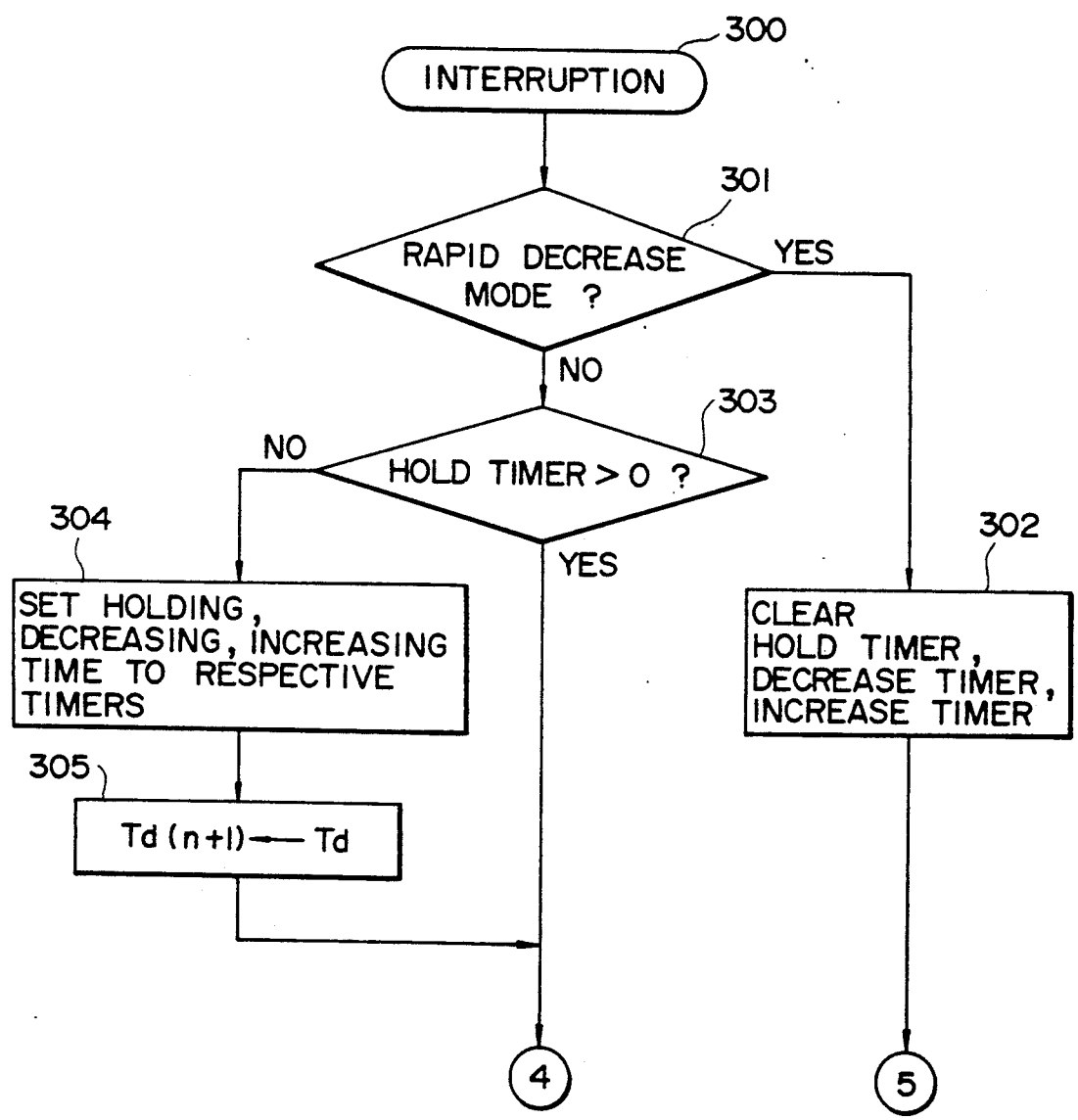
Figure 7A:
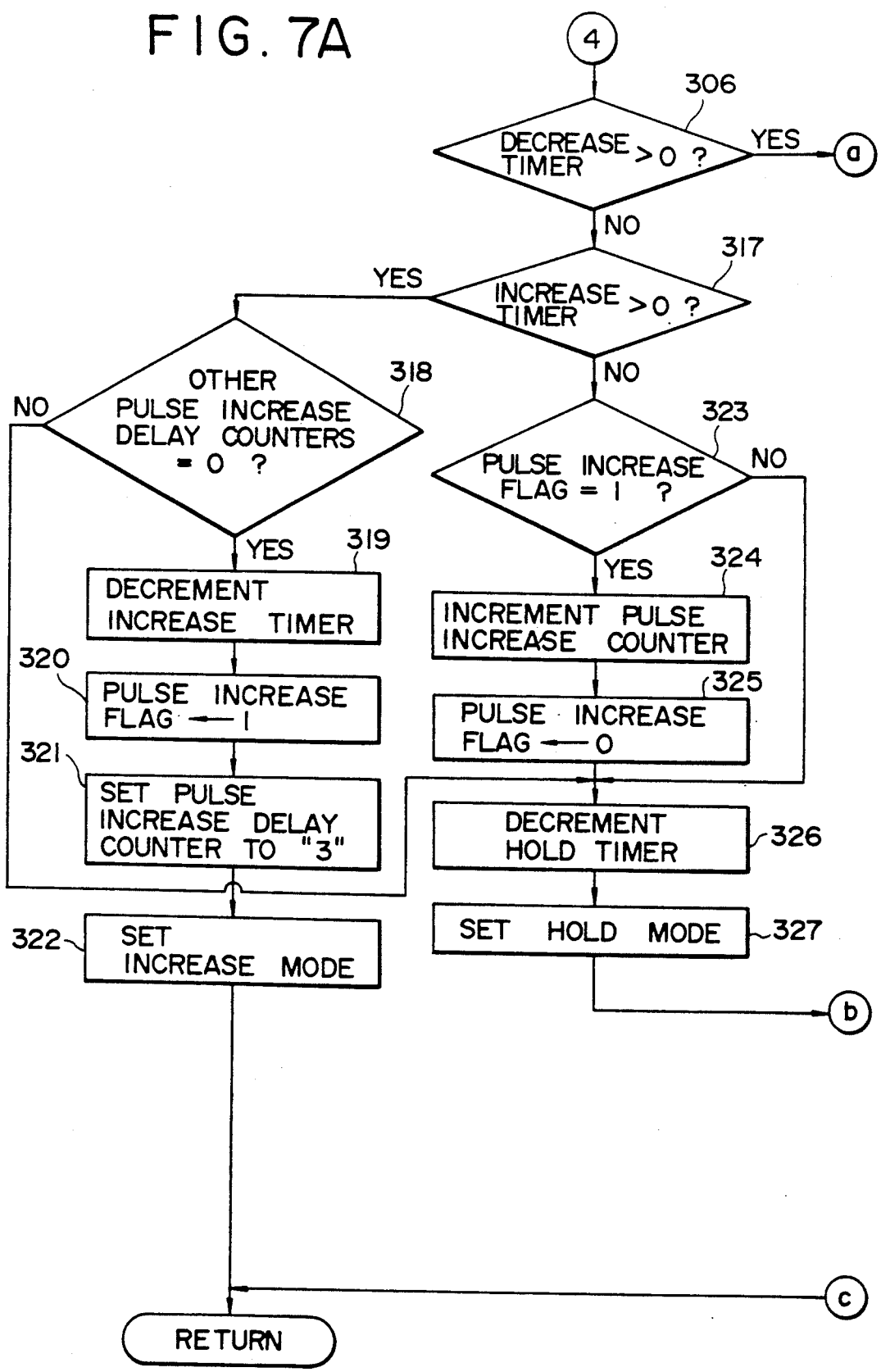
Figure 7B:
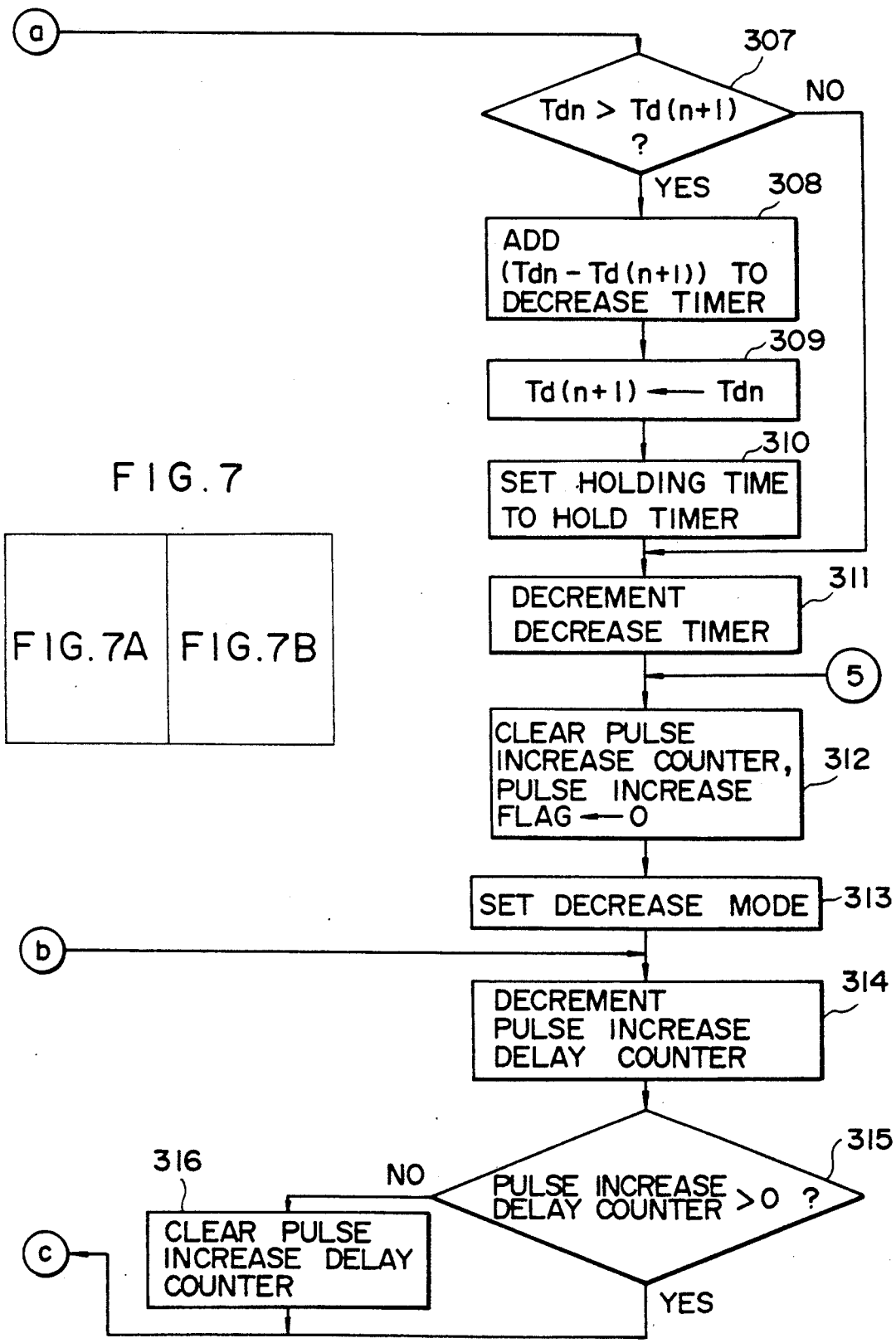
Figure 9A:
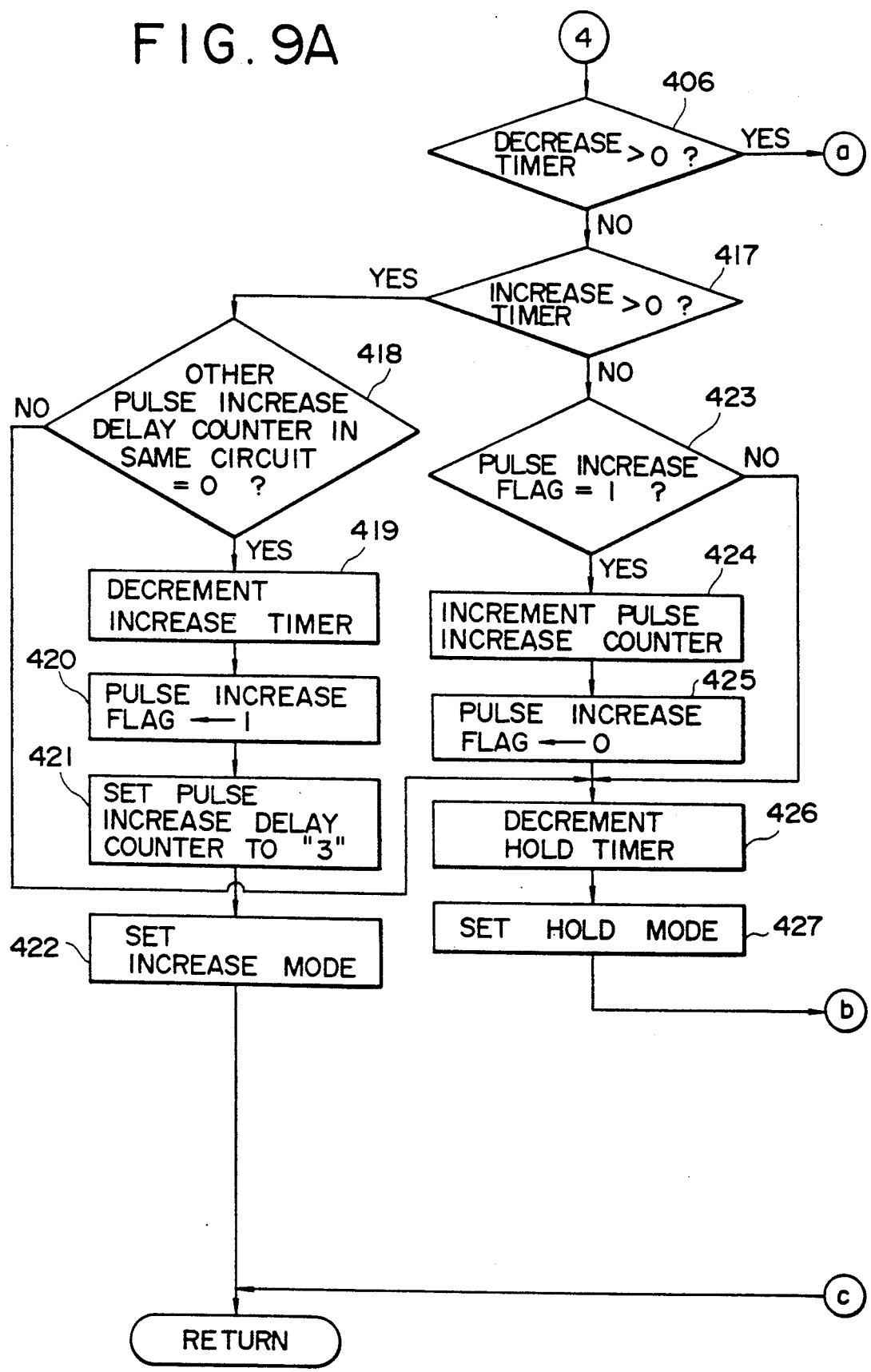

FIG. is a block diagram illustrating the arrangement of an electronic controller as shown in FIG. 1;

FIGS. 3, 4, 5, 6 and 7 which consists of FIGS. 7A and 7B are flowcharts showing the operation of the braking force control according to an embodiment of the present invention;

FIG. 8 is a diagram showing an increasing time and a holding time provided in a section, and a decreasing time and a holding time provided in a section in response to a wheel acceleration and a wheel lock rate according to the above embodiment; and FIG. 9 consists of FIGS. 9A and 9B which form a flowchart showing the operation of the braking force control according to another embodiment of the present invention.

DESCRIPTION OF THE PREFERRED EMBODIMENTS

Referring to FIG. 1, there is schematically illustrated an embodiment of the present invention, wherein pumps 21, 22, reservoir 23, 24 and solenoid valves 31 to 38 are disposed in hydraulic circuits for connecting a hydraulic pressure generator 2 which includes a master cylinder 2a and a booster 2b operated in response to depression of a brake pedal 3, to wheel brake cylinders 51 to 54 of road wheels FR, FL, RR, and RL. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side, and a so-called diagonal circuit is employed as is apparent from FIG. 1.

The solenoid valves 31, 32 and solenoid valves 33, 34 are disposed respectively in hydraulic circuits for connecting one output port of the master cylinder 2a to the wheel brake cylinders 51, 54, and the pump 21 is disposed between the master cylinder 2a and the solenoid valves 31 to 34. Similarly, the solenoid valves 35, 36 and solenoid valves 37, 38 are disposed respectively in hydraulic circuits for connecting the other output port of the master cylinder 2a to the wheel brake cylinders 52, 53, and the pump 22 is disposed 38. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the normally open solenoid valves 31, 33, 35, 37. The hydraulic circuits at the drain side of the normally closed solenoid valves 32, 34 are connected to the pump 21 through the reservoir 23, and the hydraulic circuits at the drain side of the solenoid valves 36, 38 are connected to the pump 22 through the reservoir 24. Each of the reservoirs 23, 24 is provided with a piston and a spring, and functions so as to store the brake fluid returned from each of the solenoid valves 32, 34, 36, 38 through the hydraulic circuits at the drain side thereof, and to supply the brake fluid to each of those solenoid valves when the pumps 21, 22 operate.

Each of the solenoid valves 31 to 38 is a two ports-two positions solenoid operated changeover valve, and is in its first operating position as shown in FIG. 1 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 1 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 38 turned on or off, the hydraulic braking pressure in each of the wheel brake cylinders 51 to 54 (hereinafter referred to as wheel cylinder pressure) is decreased or increased. Namely, when the current is not fed to the solenoid coil of each of the solenoid valves 31 to 38, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. As the solenoid valves 31 to 38, there may be employed three ports-two positions solenoid operated valves of a half number of the valves 31 to 38.

The above-described solenoid valves 31 to 38 are connected to the electronic controller 10 which controls the operation of the solenoid valves 31 to 38. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor.

Figure 2:
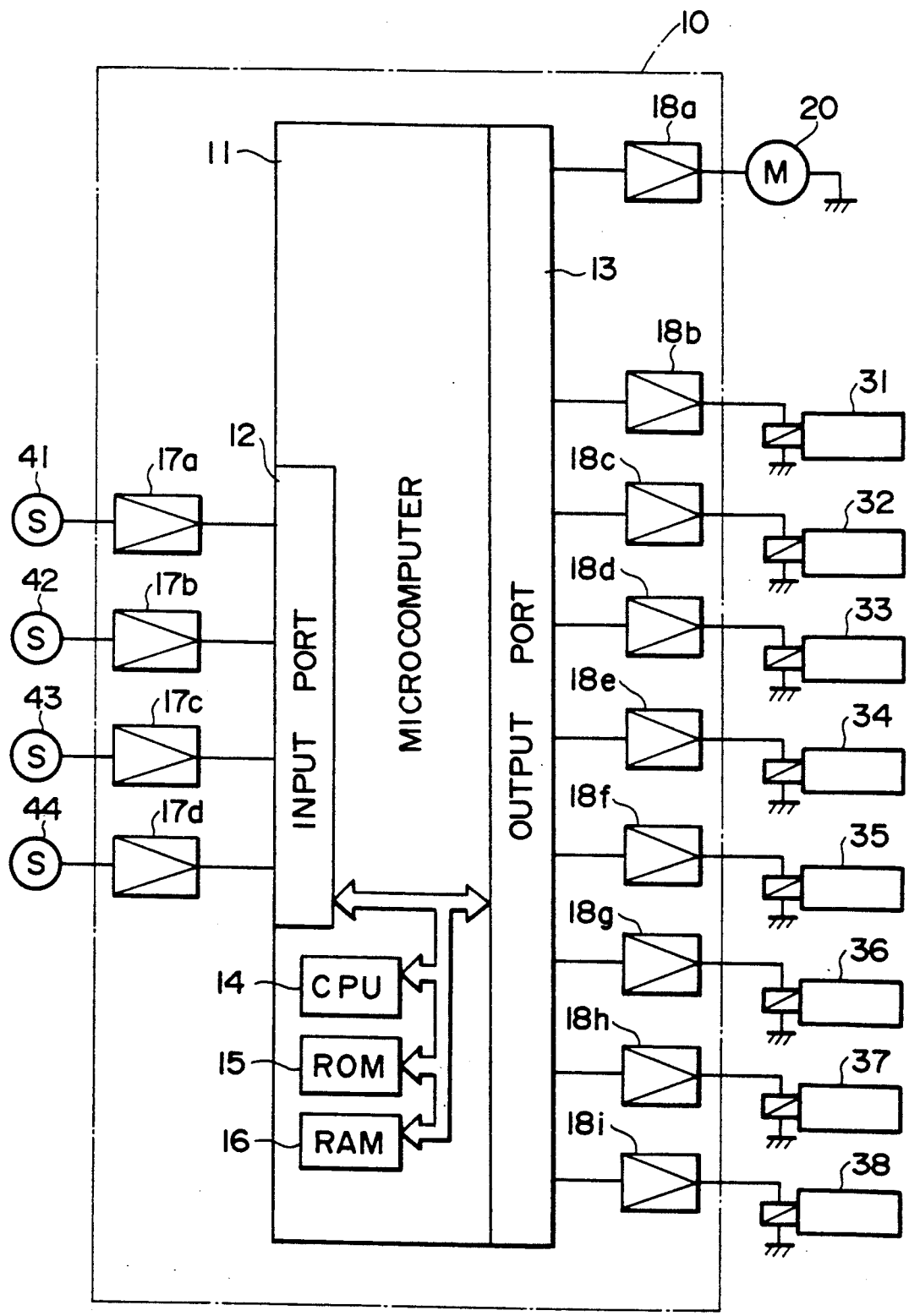

As shown in FIG. 2, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signal detected by each of the wheel speed sensors 41 to 44 is fed to the input port 12 via respective amplification circuits 17a to 17d and then to the CPU 14. Then, a control signal is output from the output port 13 to the electric motor 20 via a drive circuit 18a, and control signals are output to the solenoid valves 31 to 38 via the respective drive circuits 18b to 18i.

A program routine executed by the electronic controller 10 for the anti-skid control will now be described with reference to FIGS. 3-7, which are flowcharts showing an operation executed in accordance with a program of one embodiment of the present invention, which program is executed repeatedly at intervals of a predetermined period of time.

The program routine provides for initialization of the system at Step 201 where various counters, timers or the like are cleared. As for internal registers of the microcomputer 11, there are provided mode registers and flag registers. The mode registers are arranged to provide various modes such as a decrease mode, an increase mode and a hold mode which decreases, increases and holds the wheel cylinder pressure respectively. In addition, the mode registers provide a pulse increase mode, a pulse decrease mode and a rapid decrease mode. The pulse decrease mode performs a "decrease pressure" operation for decreasing the wheel cylinder pressure during a first predetermined period of time properly set as described later, and performs a "hold pressure" operation for holding the wheel cylinder pressure as it is during a second predetermined period of time following the decrease pressure operation to repeatedly perform the "decrease pressure" and "hold pressure", i.e., to perform a "pulse decrease pressure". The pulse increase mode is a mode to repeatedly perform a "increase pressure" operation for increasing the wheel cylinder pressure and the "hold pressure" operation, i.e., to perform a "pulse increase pressure". The rapid decrease mode is a mode to perform only the "decrease pressure" operation, but decrease the wheel cylinder pressure rapidly comparing with the operation in the pulse decrease mode. As to the flags, there are provided at least a rapid decrease flag which is set (to "1") to provide the rapid decrease mode, and a pulse increase flag which is set to provide the pulse increase mode.

As to the counters, there is provided at least a pulse increase counter which counts the number of the "pulse increase pressure" performed, and a pulse increase delay counter which counts a delay time between the timings of increasing the hydraulic pressure in at least two wheel brake cylinders out of the wheel brake cylinders 51 to 54, which are shifted each other to prevent the hydraulic braking pressures in the two wheel brake cylinders from being increased simultaneously. In the present embodiment, the delay time is set to 3 milliseconds in view of the delay which occurs when the solenoid valves 31 to 38 are turned off. As to the timers, there are provided a system timer, as well as a decrease timer, an increase timer and a hold timer which output a decrease mode signal, an increase mode signal and a hold mode signal for a predetermined period of a decreasing time, an increasing time and a holding time respectively.

Figure 3:
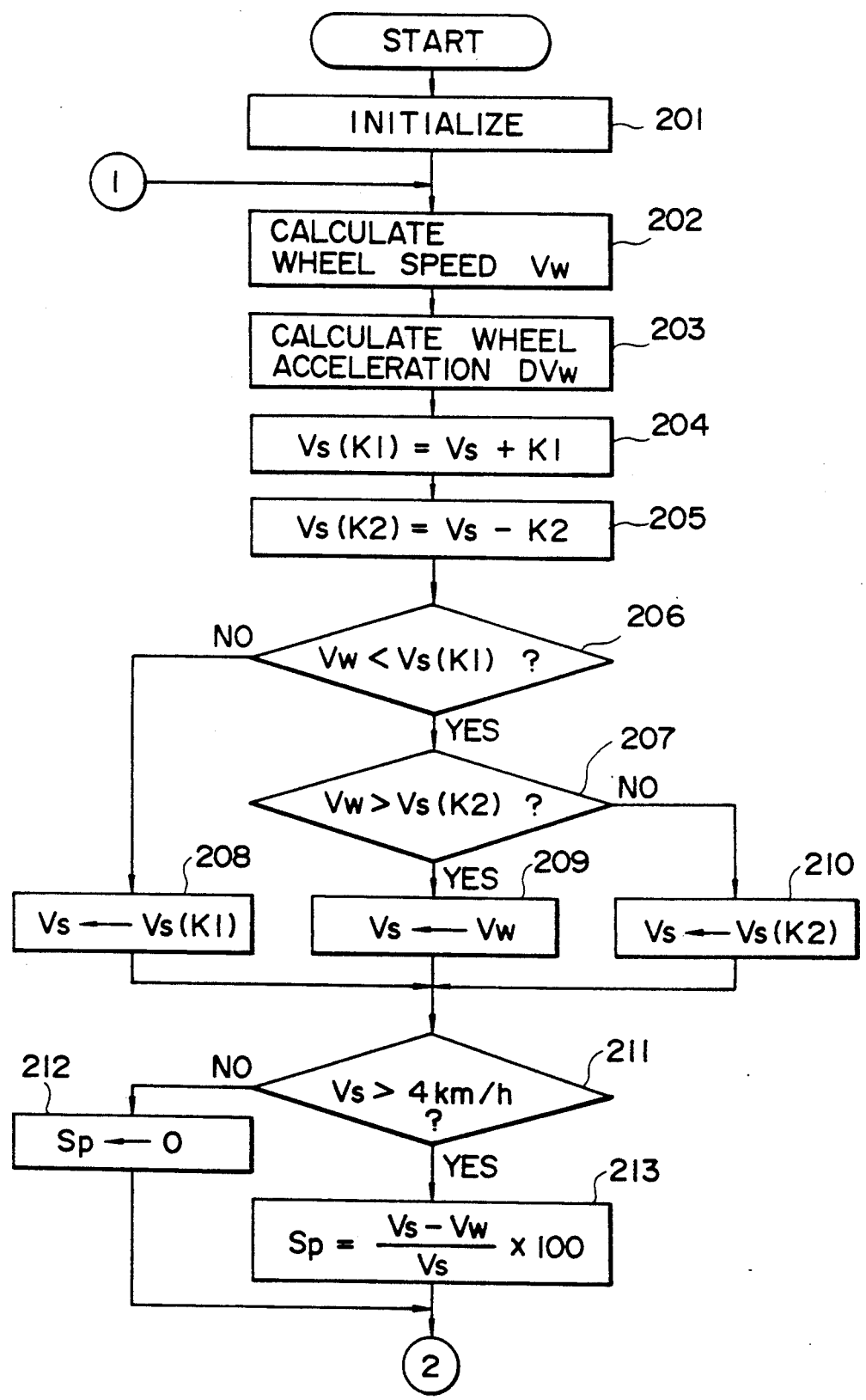

Then, the program proceeds to Step 202 in FIG. 3, where the wheel speed of each of the road wheels is calculated in known fashion on the basis of the output signal from each of the wheel speed sensors 41 to 44. Hereinafter will be used a vehicle speed Vw of one of the road wheels representing others for simplicity. The rest of the road wheels will be controlled in the same manner as the one explained. Next, the wheel acceleration DVw is calculated from the wheel speed Vw at Step 203. The wheel acceleration DVw includes the wheel deceleration which is indicated by a negative value, while the acceleration is indicated by a positive value. The program proceeds further to Steps 204, 205, where a first set speed Vs(K1) and a second set speed Vs(K2) are obtained by adding a certain value K1 to the estimated vehicle speed Vs calculated at the preceding cycle of the routine, and subtracting a certain value K2 therefrom respectively. The certain value K1 corresponds to a speed having 4.0 G (G is the acceleration of gravity) which is the highest value of a vehicle acceleration AVv, whereas the certain value K2 corresponds to a speed having −1.2 G which is the lowest value of a vehicle deceleration DVv.

Then, the program proceeds to Step 206 where the wheel speed Vw is compared with the first set speed Vs(K1). If it is determined that the wheel speed Vw is not less than the first set speed Vs(K1), the program proceeds to Step 208 where the estimated vehicle speed Vs is set to the first set speed Vs(K1). If the wheel speed Vw is less than the first set speed Vs(K1), the program proceeds to Step 207 where the wheel speed Vw is compared with the second set speed Vs(K2). If it is determined that the wheel speed Vw is greater than the second set speed Vs(K2), the program proceeds to Step 209 where the estimated vehicle speed Vs is set to the wheel speed Vw. If the wheel speed Vw is not greater than the second set speed Vs(K2), the program proceeds to Step 210 where the estimated vehicle speed Vs is set to the second set speed Vs(K2). In the case where a wheel speed sensor is mounted on each of the road wheels, the estimated vehicle speed Vs is calculated on the basis of the maximum wheel speed in known fashion.

Thereafter, the program proceeds to Step 211 where it determines if the estimated vehicle speed Vs is greater than the minimum speed (4 km/h) for initiating the anti-skid control. If it is not greater than the minimum speed, the program proceeds to Step 212 where a slip rate Sp is set to zero and proceeds further to Step 214. If the estimated vehicle speed Vs is greater the minimum speed, the program proceeds to Step 213 where the slip rate Sp is calculated from the estimated vehicle speed Vs and the wheel speed Vw, and proceeds further to Step 214.

At Step 214, a wheel speed deviation $\Delta Vw$ is calculated as a difference between the estimated vehicle speed Vs and the wheel speed Vw. The program then proceeds to Step 215 where it determines if the motor 20 is in an off condition, or determines whether or not the anti-skid control has been initiated. If the motor 20 is in an on condition, i.e., the anti-skid control operation is being performed, the program proceeds to Steps 219. If the motor 20 is in the off condition like in the initial condition, the program proceeds to Steps 216 and 217. Firstly, at Step 216, it is determined if the estimated vehicle speed Vs is greater than a predetermined speed of 10 km/h. If it is not greater than 10 km/h, the program proceeds to Step 225 in FIG. 5. If the estimated vehicle speed Vs exceeds 10 km/h, the program proceeds to Step 217 where it determines if the wheel speed Vw is less than the value of (K3·Vs−K4). If an affirmative decision is made, the program proceeds to Step 218 where the motor 20 is operated, whereas if a negative decision is made, the program proceeds to Step 225. The value of (K3·Vs−K4) used at Step 217 provides a threshold level for determining the initiation of anti-skid control, wherein K3 and K4 are certain values, and in the present embodiment, K3 is set to 0.95 and K4 is set to 2.0 km/h for example. The values K3, K4 may be set to various values depending on the various vehicle characteristics.

Then, the program proceeds to Step 219 where a wheel lock rate Lk for indicating a locking condition of the road wheel is calculated in accordance with the following equation (1):

$$Lk = \frac{C \cdot Sp + D \cdot \Delta Vw}{C + D} \quad (1)$$

where C and D are certain values for giving weight to the slip rate Sp and the wheel speed deviation $\Delta Vw$. In general, the more the slip rate Sp is given weight, the more likely the wheel cylinder pressure is excessively decreased in the low speed area, while the more the wheel speed deviation $\Delta Vw$ is given weight, the more likely the wheel cylinder pressure is excessively decreased in the high speed area. At the next Step 220, the decreasing time and holding time of the wheel cylinder pressure are set to those times defined in the pulse decrease mode respectively in response to the values of the wheel lock rate Lk and wheel acceleration DVw, or the increasing time and holding time of the wheel cylinder pressure are set to those times defined in the pulse increase mode respectively in response to those values Lk and DVw, in accordance with a map or table as shown in FIG. 8. If the rapid decrease mode is selected in the table of FIG. 8, the rapid decrease flag is set (to "1").

In FIG. 8, the abscissa represents the wheel acceleration DVw, and the ordinate represents the wheel lock rate Lk which indicates a positive value in the downward direction from a point crossed by the abscissa and a negative value in the upward direction therefrom. The wheel acceleration DVw indicates zero G (G is the acceleration of gravity) at a point crossed by the ordinate, and indicates a positive value in the rightward direction therefrom and a negative value (i.e., deceleration) in the leftward direction therefrom. In accordance with the values of the wheel acceleration DVw and the wheel lock rate Lk, there is formed the table as shown in FIG. 8, which is stored in the memory of the microcomputer 11 and in which a central zone surrounded by double lines a and b is provided for the pulse decrease mode. A right zone defined on the right side of the double line a is provided for the pulse increase mode, while a left zone defined on the left side of the double line b is provided for the rapid decrease mode so that the holding time has been set to zero in the left zone. In the pulse increase mode, the increasing time (milliseconds) is provided at the upper row in each section of the table, while the holding time (milliseconds) is provided at the lower row in each section. In the pulse decrease mode, the decreasing time (ms) is provided at the upper row in each section of the table, while the holding time (ms) is provided at the lower row in each section.

The pulse decrease mode is a pressure control mode which alternately decreases and holds the wheel cylinder pressure repeatedly, so that the wheel cylinder pressure is reduced with the solenoid valves 31 to 38 operated in response to the decreasing time and the holding time set as described above. Accordingly, the decreasing speed of the wheel cylinder pressure is controlled in accordance with the proportion of the decreasing time and holding time. Similarly, in the pulse increase mode, the solenoid valves 31 to 38 are operated in response to the increasing time at the upper row in each section and the holding time at the lower row. The decreasing time, increasing time and holding time are counted by the aforementioned decrease timer, increase timer and hold timer respectively. Regarding to the proportion of the decreasing time and holding time in the pulse decrease mode, since the wheel acceleration DVw corresponds to the sufficient or insufficient amount of the wheel cylinder pressure, the proportion of the decreasing time and increasing time is provided such that the more the wheel acceleration is reduced, i.e., the wheel deceleration is increased, the more the wheel cylinder pressure is decreased, namely the decreasing time becomes longer while the holding time becomes shorter. In the case where the wheel lock rate Lk is large, it is determined that the vehicle is traveling on the road of rather low coefficient of friction, so that the proportion of the decreasing time and holding time is provided for decreasing the wheel cylinder pressure largely, since in case of rather low wheel cylinder pressure, the decreasing speed of the wheel cylinder pressure therefrom is low.

As to the pulse increase mode, however, in the case where the wheel acceleration DVw is large, the proportion of the increasing time and holding time is provided for increasing the wheel cylinder pressure largely even when the wheel lock rate Lk is large, so that the braking distance is prevented from being extended due to insufficiency of the wheel cylinder pressure. Further, in the case where the road wheel is likely to be locked after the wheel lock rate Lk has become small, the proportion of the increasing time and holding time is provided for increasing the wheel cylinder pressure gradually, so that the rapid decrease of the wheel speed Vw is prevented. Thus, a fine control of the wheel cylinder pressure can be performed in accordance with various characteristics in braking operation such as the response of the solenoid valves 31 to 38, the decreasing speed of the wheel cylinder pressure, the increasing speed thereof or the like, by properly providing the proportion of the decreasing time and holding time in the pulse decrease mode on each of the road wheels individually, and that of the increasing time and holding time in the pulse increase mode.

Figure 4:
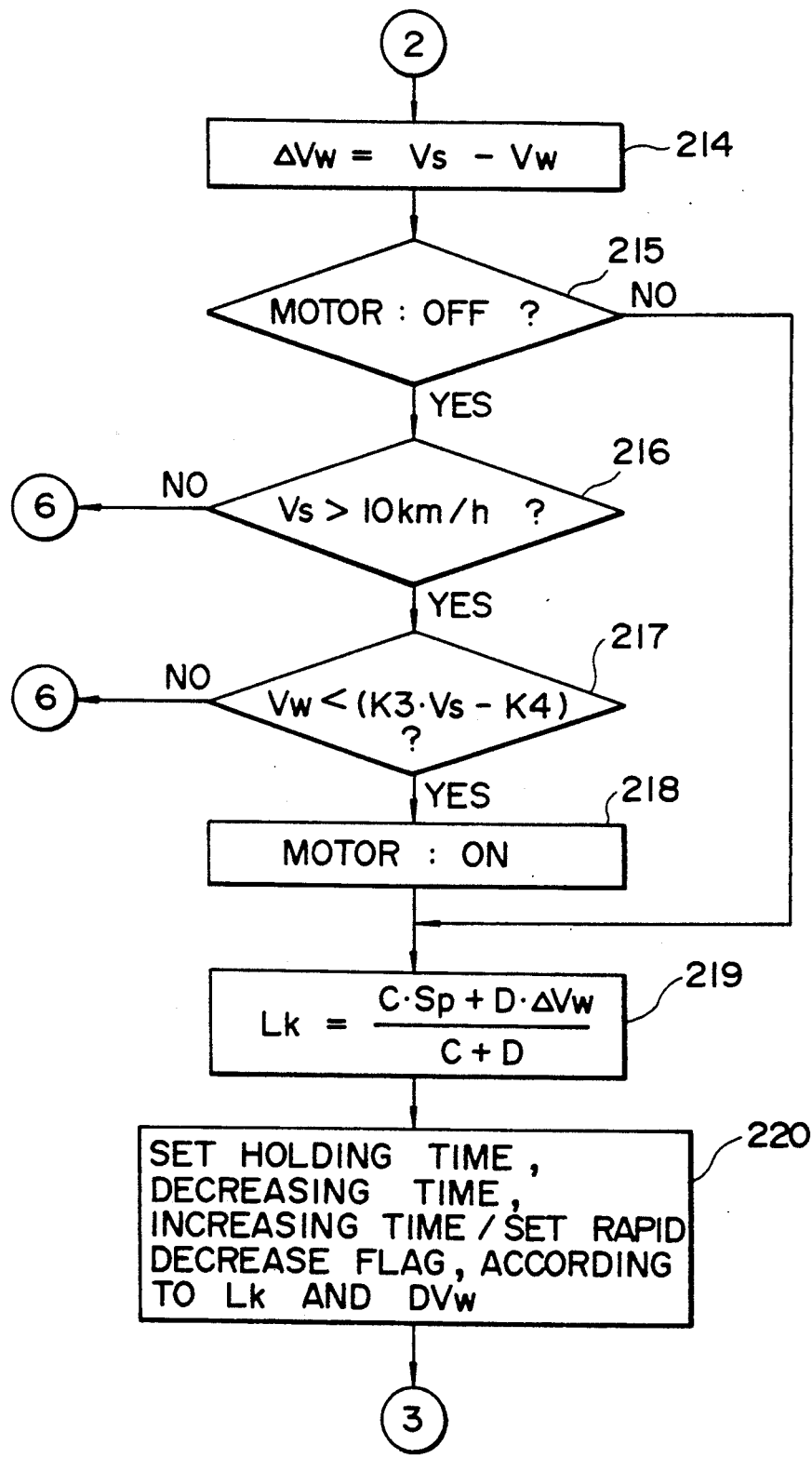

From Step 220 in FIG. 4, the program proceeds to Steps 221 and 222 in FIG. 5 where it determines if the anti-skid control is to be finished. Namely, if the pulse increase counter counts a predetermined number K9 or more, or if the estimated vehicle speed Vs is 5 km/h or less when the counter counts less than the number K9, the program proceeds to Step 223 where the motor 20 is turned off and the solenoid valves 31 to 38 are turned off. Then, the program proceeds to Step 224 where the hold timer, decrease timer, increase timer and pulse increase counter are cleared, and where the pulse increase flag and rapid decrease flag are reset. Thereafter, at Steps 225 to 227, the operation period of 3 to 5 milliseconds in general is set. That is, if the system timer does not exceed a predetermined time T1, it is incremented at Step 226, and if the predetermined time T1 elapses, the system timer is cleared at Step 227 and the program returns to Step 202 in FIG. 3. If the pulse increase counter counts less than the number K9 and the estimated vehicle speed Vs is greater than 5 km/h, the program proceeds to Step 225.

FIGS. 6 and 7 show a routine for interruption which interrupts the above described routine every one millisecond to feed driving signals to solenoid valves 31 to 38. Firstly, at Step 301, the program determines if the rapid decrease mode is set, i.e., if the rapid decrease flag was set at Step 220. In case of the rapid decrease mode, the hold timer, decrease timer and increase timer are cleared to zero respectively at Step 302, and the program proceeds to Step 312. If the rapid decrease mode is not set, the program proceeds to Step 303 where it determines if the hold timer is set, i.e., if it exceeds zero. If the hold timer is zero, the program proceeds to Step 304 where the holding time, decreasing time and increasing time defined at Step 220 are set to the hold timer, decrease timer and increase timer respectively. Thereafter, at Step 305, the decreasing time Td at present cycle is set to the decreasing time Td(n+1) for the next cycle.

Next, the program proceeds to Step 306 as shown in FIG. 7A where it determines if the decrease timer is set.

If it is set, the program proceeds to Step 307 to 313 in FIG. 7B where the decrease mode is set. At Steps 307 and 308, when the decreasing time has been extended due to out of control from the table of FIG. 8 during the decrease mode signal outputs in the pulse decrease mode, the decreasing time is reset to a new decreasing time. Namely, if the present decreasing time Tdn comes to be longer than the next decreasing time $Td(n+1)$ set at Step 305, the difference therebetween $(Tdn-Td(n+1))$ is added to the present time of the decrease timer, then the next decreasing time $Td(n+1)$ is reset to the present decreasing time Tdn at Step 309, and the program proceeds to Step 310 where the hold timer is set to the holding time at that time according to the table of FIG. 8. Thereafter, the decrease timer is decremented by one $(-1)$ at Step 311, then the pulse increase counter is cleared, and the pulse increase flag is reset to zero respectively at Step 312. Accordingly, the decrease mode signal outputs at Step 313, so that the solenoid valves 31 (33, 35, 37) located on the hydraulic pressure supplying side are turned on to block the supply of hydraulic pressure, and the solenoid valves 32 (34, 36, 38) located on the drain side are turned on to drain the hydraulic pressure to the reservoirs 23 (24).

When the wheel cylinder pressure has been decreased at Step 313 as described above, the program proceeds to Step 314 where the pulse increase delay counter is decremented $(-1)$, and further proceeds to Step 315 where it determines if the pulse increase delay counter is greater than zero. If the pulse increase delay counter is not greater than 0, the program proceeds to Step 316 where the pulse increase delay counter is cleared to return to the main routine as shown in FIG. 3 to 5. If the pulse increase delay counter is greater than zero, the program returns to the main routine without Step 316 executed.

Returning to Step 306, if the decrease timer is not set, the program proceeds to Step 317 where it determines if the increase timer is set. If the increase timer is set, the program proceeds to Step 318 where it determines whether or not all the pulse increase delay counters of road wheels other than the road wheel under control are zero ("0"). If all of other pulse increase delay counters are zero, the program proceeds to Step 319 where the increase timer is decremented by one $(-1)$, and further proceeds to Step 320 where the pulse increase flag is set (to "1"). Then, at Step 321, the pulse increase delay counter is set to "3", and the program proceeds to Step 322 where the increase mode is set. Accordingly, the solenoid valves 32, 34, 36 and 38 are turned off, and one of the solenoid valves 31, 33, 35 and 37 is turned off, so that the hydraulic pressure supplying side of the wheel brake cylinder mounted on the road wheel as to which the pulse increase delay counter is set to "3" is open and its drain side is closed.

In the case where it is determined at Step 317 that the increase timer is not set (i.e., zero), the program proceeds to Step 323 where it determines if the pulse increase flag is set. If yes, the program proceeds to Step 324 where the pulse increase counter is incremented by one $(+1)$, and further proceeds to Step 325 where the pulse increase flag is reset to zero. Then, the hold timer is decremented by one $(-1)$ at Step 326, and the hold mode is set at Step 327. If it is determined at Step 323 that the pulse increase flag is not set, the program proceeds to Step 326 without executing Steps 324, 325. At Step 327, the solenoid valve 31 (33, 35, 37) is turned on and the solenoid valve 32 (34, 36, 38) is turned off, so that the wheel cylinder pressure in each of the wheel brake cylinders 51 to 54 is held as it is. After the hold mode has been set at Step 327, the program proceeds to Steps 314, 315 and 316 which are executed as described above. If it is determined that all the pulse increase delay counters are not zero, the program proceeds to Step 326 where the hold timer is decremented by one $(-1)$, without Steps 319 to 322 executed, and further proceeds to Step 327 where the hold mode is set. Thereafter, the program proceeds to Steps 314 to 316.

According to the present embodiment, therefore, the decreasing time, increasing time and holding time are adequately set in accordance with the relationship between the wheel acceleration DVw and the wheel lock rate Lk, so that most appropriate proportion of those times may be set in view of the increasing or decreasing characteristic of the wheel cylinder pressure controlled by the pressure control means such as the solenoid valves 31 to 38. For example, when both the wheel acceleration DVw and the wheel lock rate Lk are close to zero, the proportion of the decreasing time and holding time may be set to provide the decrease mode in which the amount of decreasing pressure is reduced. If the decreasing time is controlled to be increased gradually in response to increase of the wheel lock rate Lk and the wheel deceleration, i.e., the decrease of the wheel acceleration DVw, any influence affected by dispersion of responses of the pressure control means such as the solenoid valves 31 to 38 will be made small. In the case where the wheel acceleration DVw is relatively small, i.e., the wheel speed Vw starts increasing, the increasing time will be reduced to prevent the road wheel from being locked.

In the present embodiment, the interruption routine as shown in FIGS. 6 and 7 is executed on each of the road wheels in order. At Step 318, the increase mode is not set even when the increase timer exceeds zero, unless all the pulse increase delay counters for other road wheels are zero (0). Namely, unless the pulse increase delay counter for the road wheel set to the increase mode comes to be zero when 3 milliseconds has elapsed as the delay time which is set in view of the delay which occurs when the solenoid valve provided for the above road wheel is turned off, the road wheels other than the above road wheel are not set to the increase mode even when the increase timer exceeds zero, but to the hold mode. Thus, the timings of increasing the wheel cylinder pressures for the road wheels do not coincide with each other, so that the pressure characteristic such as the increasing speed of the wheel cylinder pressure is stable to facilitate a desired anti-skid control. Also, it can be prevented that the increase of the wheel cylinder pressure will cause large decrease of the master cylinder pressure to thereby enlarge depression of the brake pedal. Consequently, a stable and preferable braking operation is performed without injuring the pedal feeling, i.e., the feeling in braking operation.

FIG. 9 consisting of FIGS. 9A and 9B shows a part of flowchart executed in another embodiment of the present invention, in which the Steps shown in FIGS. 3 to 6 are also executed. Steps 406 to 417 and Steps 423 to 427 are the same as those in the aforementioned embodiment, so that the explanation thereof will be omitted. In FIG. 9, the same Steps as those shown in FIG. 7 are designated by corresponding reference numerals with 100 added thereto respectively. In FIG. 9, following Step 417, the program proceeds to Step 418 where it determines whether or not the pulse increase delay counter for the other wheel brake cylinder disposed in the same hydraulic circuit connected to a common fluid pump as that connected to the wheel brake cylinder mounted on the road wheel under control is zero (0). That is, supposing that the road wheel FR (or FL) is under control, it is determined whether or not the pulse increase delay counter for the road wheel RL (or RR) is zero. If it is zero, the program proceeds to Step 419 where the increase timer is decremented, and further proceeds to Step 420 where the pulse increase flag is set. Thereafter, at Step 421, the pulse increase delay counter is set to "3", then the increase mode is set at Step 422.

According to the present embodiment, therefore, the pulse increase delay counter for the road wheel FR under control is set to "3". When the road wheel FR is set to the increase mode, the road wheel FL or RR is allowed to be set to the increase mode, but the road wheel RL is not set to the increase mode, but set to the hold mode even if its increase timer exceeds zero, unless the pulse increase delay counter for the road wheel FR comes to be zero after the lapse of 3 milliseconds of the delay time set in view of the delay which occurs when the solenoid valve provided for the road wheel FR is turned off. According to this embodiment, since the timings of increasing the wheel cylinder pressure for the two road wheels in the same hydraulic circuit connected to the common fluid pump do not coincide with each other, the pressure characteristic such as the increasing speed of the wheel cylinder pressure in the hydraulic circuit connected to the common fluid pump is stable. Thus, this embodiment has the same effects as those obtained in the aforementioned embodiment, and is effectuated especially in the case where the right and left rear road wheels are braked in response to the same signal under the low-select control of the rear road wheels. In either of the above-described embodiments, the proportion of the increasing time and decreasing time, and that of the decreasing time and holding time are determined in accordance with the table as shown in FIG. 8, while those proportions may be determined in accordance with various equations.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle having wheel brake cylinders mounted on road wheels for applying braking forces thereto and a master cylinder for supplying a hydraulic braking pressure to said wheel brake cylinders, said wheel brake cylinders including right wheel brake cylinders mounted on road wheels disposed on one side of the vehicle and left wheel brake cylinders mounted on road wheels disposed on an oppositely positioned side of the vehicle, said control system comprising:
  means for detecting a wheel speed of at least one of said road wheels and providing an output signal corresponding to said wheel speed;
  pressure control means for receiving said output signal, and for increasing, holding and decreasing said hydraulic braking pressure supplied to each of said wheel brake cylinders during an increase mode, a hold mode and a decrease mode respectively which are determined in response to variations in said wheel speed, said pressure control means controlling said hydraulic braking pressure supplied to each of said wheel brake cylinders in response to a ratio between an increasing time that is set for increasing said hydraulic braking pressure and a holding time that is set for holding said hydraulic braking pressure in said increase mode; and
  prohibition means for prohibiting the increasing time that is set for one of said right wheel brake cylinders from being coincident with the increasing time that is set for one of said left wheel brake cylinders in said increase mode.

2. An anti-skid control system for an automotive vehicle as set forth in claim 1, wherein said wheel brake cylinders are connected to said master cylinder through two hydraulic circuits, and wherein said one right wheel brake cylinder and said one left wheel brake cylinder are connected to one of said hydraulic circuits.

3. An anti-skid control system for an automotive vehicle as set forth in claim 1 further comprising means for setting an estimated vehicle speed calculated on the basis of said wheel speed, wherein said pressure control means controls said hydraulic braking pressure supplied to each of said wheel brake cylinders in response to a result of comparison between said wheel speed and said estimated vehicle speed.

4. An anti-skid control system for an automotive vehicle having wheel brake cylinders mounted on road wheels for applying braking forces thereto and a master cylinder for supplying a hydraulic braking pressure to said wheel brake cylinders, said wheel brake cylinders including right wheel brake cylinders mounted on road wheels disposed on one side of the vehicle and left wheel brake cylinders mounted on road wheels disposed on an oppositely positioned side of the vehicle, said control system comprising:
  means for detecting a wheel speed of each of said road wheels and providing output signal corresponding to said wheel speed;
  means for calculating wheel acceleration of each of said road wheels from said wheel speed;
  means for setting an estimated vehicle speed for each of said road wheels calculated on the basis of said wheel speed;
  means for calculating a difference between said wheel speed and said estimated vehicle speed;
  means for setting a wheel lock rate indicative of a locking condition of each of said road wheels on the basis of at least said difference between said wheel speed and said estimated vehicle speed;
  means for setting an increasing time for increasing said hydraulic breaking pressure supplied to each of said wheel brake cylinders and a holding time for holding said hydraulic braking pressure with a ratio between said increasing time and said holding time determined in response to a relationship between said wheel acceleration and said wheel lock rate, and setting a decreasing time for decreasing said hydraulic braking pressure and said holding time with a ratio between said decreasing time and said holding time determined in response to a relationship between said wheel acceleration and said wheel lock rate;
  pressure control means for alternately increasing and holding said hydraulic braking pressure supplied to each of said wheel brake cylinders in response to said increasing time and said holding time, and alternately decreasing and holding said hydraulic braking pressure in response to said decreasing time and said holding time; and prohibition means for prohibiting the increasing time that is set for one of said right wheel brake cylinders from being coincident with the increasing time provided for one of said left wheel brake cylinders.

5. An anti-skid control system for an automotive vehicle as set forth in claim 4, wherein said wheel brake cylinders are connected to said master cylinder through two hydraulic circuits, and wherein said one right wheel brake cylinder and said one left wheel brake cylinder are connected to one of said hydraulic circuits.

* * * * *